United States Patent
Brady et al.

(10) Patent No.: US 8,876,925 B2
(45) Date of Patent: Nov. 4, 2014

(54) BIO-OIL HAVING REDUCED MINERAL CONTENT, AND PROCESS FOR MAKING

(75) Inventors: Michael Brady, Studio City, CA (US); Dennis Stamires, Dana Point, CA (US); Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 667 days.

(21) Appl. No.: 13/139,954

(22) PCT Filed: Dec. 22, 2009

(86) PCT No.: PCT/US2009/069264
§ 371 (c)(1),
(2), (4) Date: Dec. 6, 2011

(87) PCT Pub. No.: WO2010/075429
PCT Pub. Date: Jul. 1, 2010

(65) Prior Publication Data
US 2012/0137571 A1 Jun. 7, 2012

Related U.S. Application Data

(60) Provisional application No. 61/140,121, filed on Dec. 23, 2008.

(51) Int. Cl.
| | | |
|---|---|---|
| *C10L 5/00* | (2006.01) | |
| *C10G 31/09* | (2006.01) | |
| *C10G 1/06* | (2006.01) | |
| *C10G 3/00* | (2006.01) | |
| *C10G 21/00* | (2006.01) | |
| *C10G 31/10* | (2006.01) | |

(52) U.S. Cl.
CPC *C10G 3/00* (2013.01); *C10G 31/09* (2013.01); *C10G 1/06* (2013.01); *C10G 2300/205* (2013.01); *C10G 21/00* (2013.01); *C10G 2300/1014* (2013.01); *C10G 31/10* (2013.01)
USPC ................... 44/605; 44/606; 585/240

(58) Field of Classification Search
CPC ........... C01L 5/44; C01L 5/442; C01L 5/445; C01L 5/46; C01L 5/48; C10G 3/00; C10G 2400/00; C10G 1/045; Y02E 50/10; Y02E 50/14; Y02E 50/30; C10B 53/00; C10B 53/02

USPC ..................... 44/605, 606; 585/240
See application file for complete search history.

(56) References Cited

U.S. PATENT DOCUMENTS

| | | | |
|---|---|---|---|
| 4,260,473 A * | 4/1981 | Bauer | 208/14 |
| 5,064,527 A | 11/1991 | Singhal et al. | |
| 5,115,084 A | 5/1992 | Himmelblau | |
| 6,830,597 B1 | 12/2004 | Green | |
| 7,935,227 B2 * | 5/2011 | Dam-Johansen et al. | 201/3 |
| 2006/0188965 A1 | 8/2006 | Wyman et al. | |
| 2008/0009055 A1 | 1/2008 | Lewnard | |

FOREIGN PATENT DOCUMENTS

CN 1443592 A 9/2003

OTHER PUBLICATIONS

International Search Report and Written Opinion for co-pending PCT Application No. PCT/US2009/0689264, filed Dec. 22, 2009; Dated Feb. 5, 2010; 8 pages.
Chinese Office Action for related Chinese Patent Application No. 200980152957.5; Applicant: KiOR, Inc.; Dated Jun. 14, 2013; 9 pages.
Extended European Search Report for corresponding European Patent Application No. 09835786.6, dated Feb. 13, 2014, 8 pages.
Kyung-Hae Lee et al., Influence of Reaction Temperature, Pretreatment, and . . . Using a Fluidized Bed, Energy & Fuels, Jun. 3, 2005, American Chemical Society, vol. 19, pp. 2179-2184.
Dinesh Mohan et al., Pyrolysis of Wood/Biomass for Bio-oil: A Critical Review, Energy & Fuels, Mar. 10, 2006, American Chemical Society, vol. 20, pp. 848-889.
Lu Qiang et al., Analysis on Chemical and Physical Properties of Bio-oil Pyrolyzed from Rice Husk, J. Anal. Appl. Pyrolysis, 2008, vol. 82, pp. 191-198.
2nd Chinese Office Action for corresponding Chinese Patent Application No. 200980152957.5 dated Feb. 7, 2014, 11 pages.
3rd Chinese Office Action for corresponding Chinese Patent Application No. 200980152957.5 dated Jul. 8, 2014, 16 pages.

\* cited by examiner

*Primary Examiner* — Cephia D Toomer
(74) *Attorney, Agent, or Firm* — Hovey Williams LLP

(57) ABSTRACT

A process is disclosed for converting a biomass material to a stabilized bio-oil. The process comprises converting the biomass to a pyrolytic oil having suspended therein particles of metal compounds, and removing at least part of the suspended metal compounds to obtain a stabilized bio-oil.

19 Claims, No Drawings

BIO-OIL HAVING REDUCED MINERAL CONTENT, AND PROCESS FOR MAKING

BACKGROUND OF THE INVENTION

1. Field of the Invention

The invention relates generally to a bio-oil having reduced mineral content, and more particularly to process for preparing such bio-oils.

2. Description of the Related Art

Depending on its origin, biomass may contain significant amounts of minerals, generally referred to as ash. In academic papers, experiments have been described in which biomass was subjected to a wash treatment prior to prolific conversion. These experiments show that minerals present in biomass have an effect on both the conversion yield and product mix of biomass conversion processes.

Biomass conversion processes generally produce gaseous, liquid, and solid products. The liquid products comprise an aqueous phase and an oil phase. The oil phase is generally referred to as bio-oil. It is generally assumed that minerals present in biomass end up in the aqueous phase of the biomass conversion products. Bio-oil is known to be unstable, which is generally ascribed to high oxygen content of the bio oil. No attention is being given to the possible role of minerals contamination of the bio-oil as a contributing factor to the instability of bio-oil.

U.S. Pat. No. 6,022,419 to Torget et al. discloses a multi-step process for acid hydrolysis of lignocellulose. The first step, which is optional, is designed to solubilize the most easily dissolved components, such as some lignin, extractives, and any protein. For this optional step, a hot aqueous medium is used having a temperature in the range of from 100 to 160° C. and a pH in the range of from 1 to 5. The extractives are not separated from the biomass.

U.S. Pat. No. 6,419,788 to Wingerson discloses a process for separating cellulose from other constituents of the lignocellulosic biomass. The focus of the disclosed process is on the removal of lignin. Extractives are removed together with lignin and residual hemicellulose. The process aims at producing a relatively clean cellulose free of lignin.

US published patent application 2008/029233 to Wingerson discloses a countercurrent process for separating cellulose fibers from other constituents of a lignocellulosic biomass. The first wash liquids can include water, or a solution of water and a mineral acid for hemicellulose hydrolysis.

These prior art processes comprised removal of extractives in the context of producing a substantially lignin free cellulose product. For the production of bio-oil it is desirable to leave the lignin in the feedstock, as it contains an important portion of the energy presence in the biomass.

Thus, there is a particular need for a process aimed at minimizing the mineral content of a bio-oil, and the bio-oil produced by such a process.

BRIEF SUMMARY OF THE INVENTION

The present invention addresses these problems by providing a process for converting a biomass material to a stabilized bio-oil, said process comprising the steps of (i) converting at least part of the biomass material to a pyrolytic oil having suspended therein particles of metal compounds; and (ii) removing at least part of the suspended metal compounds from the pyrolytic oil to obtain a bio-oil having a reduced metal content.

In a preferred embodiment, the biomass feedstock is subjected to a demineralization step prior to its conversion to pyrolytic oil, so as to reduce the amount of suspended metal compounds requiring subsequent removal.

Another aspect of the invention comprises the stabilized bio-oil obtained by the process of the invention.

DETAILED DESCRIPTION OF THE INVENTION

Biomass, in particular lignocellulosic biomass, is an abundant source of energy. There is a need for converting biomass to liquid fuel that can be used in internal combustion engines. The main routes for converting biomass to liquid fuel available today are fermentation to ethanol, and pyrolysis. Fermentation has the disadvantage that the cellulose needs to be separated from the lignin for it to be accessible to the cellulase enzymes. In addition, the fermentation reaction itself is time consuming and requires large volumes of water, making the process very expensive.

Pyrolysis produces gaseous, liquid, and solid reaction products. The liquid reaction products comprise an aqueous phase and an oil phase. The oil phase is generally referred to as bio-oil, and is known to have poor stability. This poor stability is generally ascribed to high oxygen content of the bio oil. It has indeed been shown that reducing the oxygen content, for example by hydrotreatment of the bio-oil, results in a significantly improved stability.

Any lignocellulosic biomass material comprises a certain amount of inorganic materials. These inorganic materials are generally referred to as "ash", because these materials are found in the ashes of combusted biomass. Main constituents of the ash are generally sodium, potassium, calcium, and silicon. Potassium generally is a major component of the ash. In fact, the name "potassium" derives from the word potash, which is a 16th century Dutch word for ash created by burning wood in a pot.

Many of the constituents of ash are known to have catalytic properties in the pyrolytic conversion of biomass. The presence of these components tends to decrease the yield of compensable hydrocarbons, and to increase the yield of char. It has been suggested to remove ash from the biomass prior to pyrolysis, so as to improve the bio-oil yield.

It had been assumed that the ash, being inorganic in nature, would accumulate in the aqueous phase of the liquid reaction products. It has now been discovered that significant portions of ash present in the biomass during the pyrolysis reaction end up in the bio-oil. This is presumably due to the fact that, during the pyrolysis reaction, ash minerals are agglomerated into hydrophobic particles. Silicon may play a role, as it is known to cause fusion of ashes under combustion conditions. It is assumed that the presence of silicon also contributes to the formation of hydrophobic particles under the relatively low temperatures of pyrolysis. It is further assumed that certain components of the bio-oil, such as polycarboxylic acids, may chelate metal compounds present in the ash. The chelates may be soluble in the bio-oil.

The presence of small particles of ash in the bio-oil contributes to the chemical instability of the bio-oil, because these small particles act as catalysts. An important aspect of the present invention is increasing the stability of bio-oil by removing suspended ash particles from the bio oil.

In its general form, the present invention provides a process for converting a biomass material to a stabilized bio-oil, said process comprising the steps of (i) converting at least part of the biomass material to a pyrolytic oil having suspended therein particles of metal compounds; and (ii) removing at least part of the suspended metal compounds from the pyrolytic oil to obtain a bio-oil having a reduced metal content.

It will be understood that the term "pyrolytic oil" used herein describes the material that is generally in the art referred to as "bio-oil". The term pyrolysis oil is used to describe the immediate product of the pyrolysis reaction, and to distinguish it from the bio-oil that is obtained by the process of the invention after at least part of the suspended metal compounds have been removed.

In a preferred embodiment, the step of converting at least part of the biomass material to a pyrolytic oil is carried out by heating the biomass material in the presence of a catalyst. The presence of a catalyst allows the reaction to be carried out at a lower temperature than would be possible otherwise, while still obtaining a high conversion yield. The use of a catalyst may, however, contribute to the number of particles of metal compounds in the pyrolytic oil, as catalyst material may be lost to attrition, and metal may be leached out of the catalyst by the conversion products, which tend to be acidic.

In other words, the use of a catalyst may tend to increase the quality of the pyrolytic oil, because the reaction can be carried out at a lower temperature. This effect is counteracted by the contribution of the catalyst to the presence of suspended particles of metal compounds in the pyrolytic oil, which tend to contribute to the instability of the pyrolytic oil. The process of the present invention is therefore in particular suitable for processes for conversion of biomass that involve the use of catalytic materials.

It will be understood that the metal compounds present in the pyrolytic oil may originate at least in part from the biomass material itself. In catalytic processes, the metal compounds present in the pyrolytic oil may also originate at least in part from the catalyst.

It is advantageous to subject the biomass material to a mineral removal step prior to the step of converting at least part of the biomass to a pyrolytic oil. A mineral removal step increases the control over the catalytic composition that is present during the conversion step, because the contribution of indigenous materials present in the biomass to the overall catalytic properties is minimized. Such a mineral removal step also reduces the amount of metal compounds present in the pyrolytic oil that is produced by the conversion reaction, which facilitates the subsequent removal step.

In general, a mineral removal step prior to the conversion step involves exposing the biomass to a solvent under conditions that allow extraction of the minerals from the biomass material, followed by separating the solvent from the biomass. The preferred solvent for use in this mineral removal step is an aqueous solvent, because of its low cost, its safety profile, and its high solubility for the minerals present in the biomass material. The solubility of the minerals may be further increased by adding either an acid or a base to the aqueous solvent.

The mineral removal step may comprise soaking the biomass material in the aqueous solvent, and removing the aqueous solvent by mechanical action, such as kneading or pressing. The step could be repeated once or several times, so as to increase the overall efficacy of pretreatment step.

The mineral removal step may be carried out at an increased temperature, in order to increase the solubility of the minerals and to increase the rate of diffusion of the aqueous solvent into and out of all of the biomass material. Suitable temperatures are in the range of 20 to 120° C., preferably from 60 to 120° C. Care should be taken, however, to avoid hydrolysis of hemicellulose, in particular when acid is present in the aqueous solvent, as such hydrolysis leads to a loss of biomass material.

The particle size of the suspended particles in the pyrolytic oil may vary considerably, as it is in large measure determined by factors that are not directly under the control of the operator of the process, such as the origin of the biomass material, the amount of metals, such as but not limited to silicon, present in the biomass material, and the like. In general, the average particle size of the suspended particles may range from 1 nm to 100 µm, preferably 10 µm to 100 µm.

Any type of liquid/solid separation technique may be used for removing suspended metal compounds from the pyrolytic oil. Examples of suitable techniques include centrifugation, filtration (including pressure filtration), and extraction. Distillation, although very effective in removing solids from a liquid, is normally not suitable, as it requires heating of the pyrolytic oil which could result in undesirable side reactions, particularly in the presence of the suspended metal compounds. However, vacuum distillation can be carried out at much reduced temperatures and might be suitable as a separation technique.

The selection of the appropriate separation technique depends on the average particle size of the suspended metal compound particles. Larger particles, for example in the range of from 1 µm to 100 µm, can be suitably removed by filtration or centrifugation. Small particles, in the sub-micron range, may be removed by ultra filtration, centrifugation, or extraction.

It is possible that metal present in the bio-oil is solubilized by components of the bio-oil. For example, complex carboxylic acids present in the bio-oil can act as chelants. Chelated metals are generally not removed by filtration or centrifugation, but can be removed by extraction or (vacuum) distillation.

Another aspect of the invention is the stabilized bio-oil obtained by the process of the invention. The stabilized bio-oil is characterized by a metal content of less than 2% by weight, preferably less than 1% by weight, and more preferably less than 0.5% by weight. Different from bio-oil materials obtained by processes of the prior art, the stabilized bio-oil obtained by the process of the present invention can be stored for extended periods of time. This property is of great economic importance, because it allows transportation of the bio-oil over extended distances. It also allows for the integration of the processing of seasonal biomass crops into non-seasonal processes, such as crude oil refining.

An important economic obstacle to the use of biomass in an integrated energy supply network is the high transportation cost of biomass material, which is due to the low density and unwieldiness of solid biomass materials. It is desirable, therefore, to convert the biomass to a more manageable form for transportation and storage at a location near the place of harvest of the biomass. A liquid product will meet these requirements, as liquids have a high density, are pumpable, and are conveniently transported by pipeline or tank truck.

The bio-oils used by the processes of the prior art do not meet these economic requirements, because their poor stability prohibits extended storage or transportation over appreciable distances. The prior art bio-oils will need to be upgraded to make them suitable for storage and transportation. Such upgrading, for example hydro-treatment, requires sophisticated equipment able to withstand high pressures, which makes them expensive and unsuitable for a distributed network.

The bio-oils of the present invention overcomes these problems as they can be produced at low-cost, in relatively simple equipment.

An important aspect of the present invention is therefore a method of transporting a biomass-based energy carrier from a point of harvest to a refinery, said method comprising the steps of (i) harvesting biomass material at the point of harvest;

(ii) converting the biomass material to a stabilized bio-oil at a point of biomass conversion; and (iii) transporting the stabilized bio-oil to a point of refining.

Preferably, the point of biomass conversion is within 500 miles from the point of harvest. More preferably, the point of biomass conversion is within 100 miles from the point of harvest. Suitably, the stabilized bio oil is prepared by the process of the present invention.

What is claimed is:

1. A process for converting a biomass material to a stabilized bio-oil, said process comprising the steps of (i) converting at least part of the biomass material to a pyrolytic oil having suspended therein particles of metal compounds; and (ii) removing at least part of the suspended metal compounds from the pyrolytic oil to obtain a bio-oil having a reduced metal content, wherein step (i) comprises heating said biomass material and/or biomass pyrolytic vapors produced from said biomass material in the presence of a catalyst.

2. The process of claim 1 wherein the metal compounds originate at least in part from the biomass material.

3. The process of claim 1 wherein the metal compounds originate at least in part from the catalyst.

4. The process of claim 1 wherein step (i) is preceded by a mineral removal step.

5. The process of claim 4 wherein the mineral removal step comprises contacting the biomass material with an aqueous solvent or solution, at ambient or greater temperature, and at ambient or greater pressure.

6. The process of claim 5 wherein said aqueous solvent or solution comprises either an acid or a base.

7. The process of claim 5 wherein the mineral removal step comprises soaking the biomass material in the aqueous solvent, and removing aqueous solvent from the biomass material by mechanical action.

8. The process of claim 1 wherein at least part of the metal compounds are present in the form of suspended particles having a particle size in the range of from 1 nm to 100 μm.

9. The process of claim 8 wherein the suspended particles have an average particle size of from 10 to 100 μm.

10. The process of claim 1 wherein the pyrolytic oil further comprises metal chelated by one or more components of the pyrolytic oil.

11. The process of claim 1 wherein step (ii) comprises centrifugation.

12. The process of claim 1 wherein step (ii) comprises filtration.

13. The process of claim 1 wherein step (ii) comprises extraction.

14. The process of claim 1 wherein step (ii) comprises distillation under reduced pressure.

15. A stabilized bio-oil obtained by the process of claim 1.

16. The stabilized bio-oil of claim 15 having a metal content of less than 2 wt %.

17. A method of transporting a biomass-based energy carrier from a point of harvest to a refinery, said method comprising the steps of (i) harvesting biomass material at the point of harvest; (ii) converting the biomass material to a stabilized bio-oil at a point of biomass conversion; and (iii) transporting the stabilized bio-oil to a point of refining, wherein step (ii) comprises heating said biomass material and/or biomass pyrolytic vapors produced from said biomass material in the presence of a catalyst.

18. The method of claim 17 wherein the point of biomass conversion is within 500 miles from the point of harvest.

19. The method of claim 18 wherein the point of biomass conversion is within 100 miles from the point of harvest.

* * * * *